United States Patent
von Schweinitz et al.

(10) Patent No.: US 8,062,027 B2
(45) Date of Patent: Nov. 22, 2011

(54) INDUSTRIAL BURNER AND METHOD FOR OPERATING AN INDUSTRIAL BURNER

(75) Inventors: Horst Graf von Schweinitz, Bochum (DE); Andreas Munko, Wuppertal (DE)

(73) Assignee: Elster GmbH, Mainz-Kastel (DE)

(*) Notice: Subject to any disclaimer, the term of this patent is extended or adjusted under 35 U.S.C. 154(b) by 280 days.

(21) Appl. No.: 11/501,429

(22) Filed: Aug. 9, 2006

(65) Prior Publication Data
US 2007/0037107 A1 Feb. 15, 2007

Related U.S. Application Data

(60) Provisional application No. 60/707,175, filed on Aug. 11, 2005.

(51) Int. Cl.
*F23C 3/00* (2006.01)
*F23D 11/44* (2006.01)
(52) U.S. Cl. .................................. 431/158; 431/166
(58) Field of Classification Search .............. 431/158, 431/215, 278, 284, 5, 166; 60/740, 742, 60/747
See application file for complete search history.

(56) References Cited

U.S. PATENT DOCUMENTS

| | | | | |
|---|---|---|---|---|
| 3,308,869 A | * | 3/1967 | Livingston | 431/187 |
| 3,729,285 A | | 4/1973 | Schwedersky | |
| 3,782,884 A | * | 1/1974 | Shumaker | 431/186 |
| 4,586,894 A | | 5/1986 | Wünning | |
| 4,907,961 A | * | 3/1990 | Anderson | 431/8 |
| 4,946,475 A | * | 8/1990 | Lipp et al. | 48/86 R |
| 5,101,633 A | * | 4/1992 | Keller et al. | 60/737 |
| 5,102,054 A | * | 4/1992 | Halvorsen | 239/533.2 |
| 5,154,599 A | * | 10/1992 | Wunning | 431/215 |
| 5,570,679 A | * | 11/1996 | Wunning | 126/91 A |
| 5,618,173 A | * | 4/1997 | Ruhl et al. | 431/183 |
| 5,699,667 A | * | 12/1997 | Joos | 60/737 |
| 5,737,921 A | * | 4/1998 | Jones et al. | 60/740 |
| 5,762,486 A | * | 6/1998 | Leger | 431/8 |

(Continued)

FOREIGN PATENT DOCUMENTS
DE    2062 593    6/1972
(Continued)

OTHER PUBLICATIONS

Concise Statement under 37 CFR 1.56 and MPEP 609.04(a)(III).
(Continued)

*Primary Examiner* — Erick Solis
*Assistant Examiner* — Sizo Vilakazi
(74) *Attorney, Agent, or Firm* — Simpson & Simpson, PLLC

(57) ABSTRACT

The industrial burner comprising a mixing chamber, which is provided with at least one opening into a furnace room, through which opening at least a partially-mixed fuel flow from the mixing chamber dispenses into the furnace room during operation. A combustion air supplier, through which the mixing chamber is supplied with combustion air during operation, and a fuel supplier, with which fuel is introduced into the mixing chamber, are provided. The fuel supplier can switch between a first and a second operation state, wherein in the first operation state, fuel is introduced into the mixing chamber at a first angle, and in the second operation state, fuel is introduced into the mixing chamber at substantially the same axial position with respect to the opening as in the first operation state and at a second angle with respect to the axial direction of the mixing chamber.

8 Claims, 1 Drawing Sheet

U.S. PATENT DOCUMENTS

| | | | |
|---|---|---|---|
| 5,904,475 A * | 5/1999 | Ding | 431/8 |
| 6,077,072 A * | 6/2000 | Marin et al. | 432/105 |
| 6,098,406 A * | 8/2000 | Bolis et al. | 60/737 |
| 6,206,686 B1 * | 3/2001 | Nieszczur et al. | 431/8 |
| 6,434,945 B1 * | 8/2002 | Mandai et al. | 60/740 |
| 6,871,488 B2 * | 3/2005 | Oskooei et al. | 60/39.465 |
| 7,303,388 B2 * | 12/2007 | Joshi et al. | 431/10 |
| 7,402,038 B2 * | 7/2008 | Neville et al. | 431/12 |
| 7,406,827 B2 * | 8/2008 | Bernero et al. | 60/742 |
| 7,476,099 B2 * | 1/2009 | Stephens et al. | 431/115 |
| 7,621,131 B2 * | 11/2009 | Von Der Bank | 60/737 |
| 2002/0050139 A1 * | 5/2002 | Le Gal et al. | 60/742 |
| 2003/0148236 A1 * | 8/2003 | Joshi et al. | 431/9 |
| 2003/0175634 A1 * | 9/2003 | Stephens et al. | 431/8 |
| 2003/0197071 A1 * | 10/2003 | Whittaker | 239/404 |
| 2004/0035114 A1 * | 2/2004 | Hayashi et al. | 60/737 |
| 2006/0183069 A1 * | 8/2006 | Bernero et al. | 431/354 |

FOREIGN PATENT DOCUMENTS

| | | |
|---|---|---|
| DE | 2062593 | 6/1972 |
| DE | 34 22 229 | 12/1985 |
| DE | 199 20 112 | 11/2000 |
| DE | 19920112 | 11/2000 |
| DE | 100 05 256 | 8/2001 |
| DE | 10005256 | 8/2001 |
| EP | 0 293 168 | 3/1993 |
| EP | 0 657 693 | 6/1995 |
| EP | 0657693 | 6/1995 |
| EP | 0 685 683 | 12/1995 |
| FR | 1 126 610 | 11/1956 |
| FR | 1126610 | 11/1956 |
| WO | 2007/017056 | 2/2007 |

OTHER PUBLICATIONS

International Search Report for WO 2007/017056 A1.

Written Opinion of International Search Report for WO 2007/017056 A1.

* cited by examiner

INDUSTRIAL BURNER AND METHOD FOR OPERATING AN INDUSTRIAL BURNER

CROSS REFERENCE TO RELATED APPLICATIONS

This application claims the benefit under 35 U.S.C. §119(e) of U.S. Provisional Application No. 60/707,175, filed Aug. 11, 2005.

FIELD OF THE INVENTION

The invention concerns an industrial burner with low NOx-emissions, in particular for the heating of furnace rooms of industrial furnaces. In addition, the invention concerns a method for operating such a burner.

BACKGROUND OF THE INVENTION

For conversion of fuel energy into heat, so-called impulse or high-speed burners are used. The fuel and the combustion air are mixed together and ignited in a high-heat resistant combustion chamber manufactured mostly out of ceramic material. The resulting hot combustion gas flows through a nozzle-shaped outlet with high speed in the heating space, which is formed either by the furnace room itself or by the inner space of a radiant tube. The outlet of the combustion chamber can be constricted in a nozzle-shaped manner or can be formed by a nozzle crown, wherein the axes of the nozzle openings are parallel to each other or are oriented so as to diverge from each other. The mechanical energy of the gas stream, which is being discharged from the combustion chamber and which partially originates from the fuel, serves to mix and circulate the gases in the heating room, which further assists the temperature equalization in the desired manner. Such a burner is for example described in DE 34 22 229 A1.

Furthermore, from EP 0 293 168 A2 an industrial burner is known that includes a high-heat resistant combustion chamber disposed outside of the furnace room. The fuel guiding device includes a primary fuel nozzle, which opens at a rear wall of the combustion chamber that opposes the combustion gas outlet, and a secondary, heat-insulated fuel nozzle extending through the combustion chamber, which secondary nozzle opens near the combustion gas outlet. This burner is operated according to a two-stage combustion, wherein less that 50% of the total fuel supplied to the burner is introduced via the primary fuel nozzle into the combustion chamber, which is continually supplied with the entire amount of the combustion air. This primary fuel is burned with a high air surplus by forming a long flame that reaches up to the mouth of the secondary fuel nozzle near the outlet of the combustion chamber. The combustion of the remaining fuel introduced via the secondary fuel nozzle takes place directly in the radiant tube with a low air surplus.

Similarly, a burner operable according a two-stage operation is known from EP 0 685 683 B1, in which two fuel outlets are provided in a combustion chamber separated from each other in the axial direction; the outlets are selectively supplied with fuel in a first and in a second combustion operation state. In particular, when starting up the burner, the fuel supply device, which discharges into the combustion chamber separated from the nozzle-shaped outlet of the combustion chamber in the furnace room, is used in order to introduce fuel into the combustion chamber and to enable combustion in the combustion chamber. In the second operation state, the other of the fuel outlets is solely utilized, which introduces the fuel immediately proximate to the combustion chamber outlet, so that unburned fuel adjacent to the air arrives at the furnace room unmixed with the combustion air. The mixing of the fuel and the combustion air then first takes place in the furnace room.

Starting therefrom, it is an object of the invention to provide an industrial burner that is simple to construct for low NOx-emissions and is flexible to operate, and a method for operating the industrial burner.

SUMMARY OF THE INVENTION

This object is achieved according to a first aspect of the present invention with an industrial burner comprising a mixing chamber, which is provided with at least one opening into a furnace room, through which opening at least a partially-mixed fuel flow from the mixing chamber dispenses into the furnace room during operation, a combustion air supplies, through which the mixing chamber is supplied with combustion air during operation, and a fuel supplier with which fuel is introduced into the mixing chamber. The fuel supplier is adapted to switch between a first and a second operation state, wherein in the first operation state, fuel is introduced into the mixing chamber at a first angle with respect to the axial direction of the mixing chamber such that fuel and air are mixed in the mixing chamber and at least a partial reaction is carried out therein, and in the second operation state, fuel is introduced into the mixing chamber at substantially the same axial position with respect to the opening as in the first operation state and additionally at least at a second angle with respect to the axial direction of the mixing chamber, which second angle is different from the first angle.

According to a second aspect of the present invention, an industrial burner comprises a mixing chamber having an axial direction, the mixing chamber being provided with at least one opening into a furnace room, through which opening at least a partially-mixed flow from the mixing chamber dispenses into the furnace room during operation, a combustion air supplier, through which the mixing chamber is supplied with combustion air during operation, a first fuel supply device arranged and constructed to introduce fuel into the mixing chamber, a second fuel supply device arranged and constructed to introduce fuel into the mixing chamber at substantially the same axial position with respect to the opening of the mixing chamber at a second angle with respect to the axial direction of the mixing chamber, which second angle is different from the first angle, and a control arranged and constructed to switch the first and second fuel supply device between a first and a second operation state. In the first operation state, fuel is introduced into the mixing chamber only through the first fuel supply device such that fuel and air are mixed in the mixing chamber and at least a partial reaction is carried out therein. In the second operation state, fuel is introduced into the mixing chamber in addition to the first fuel supply device through the second fuel supply device at a proportion of 10 to 100% while the rest of the total fuel flow is introduced through the first fuel supply device.

According to a third aspect of the present invention, an industrial burner comprises a mixing chamber connected with a furnace room such that at least a partially-mixed flow from the mixing chamber dispenses into the furnace room during operation, a combustion air supplier for supplying the mixing chamber with combustion air during operation of the industrial burner, and a fuel supplier for introducing fuel into the mixing chamber, wherein the fuel supplier is arranged and constructed to switch between a first and a second operation state. In the first operation state, fuel is introduced into the mixing chamber at a first angle with respect to the axial direction of the mixing chamber such that fuel and air are mixed in the mixing chamber and at least a partial reaction is carried out therein. In the second operation state, fuel is introduced into the mixing chamber at a second angle with respect to the axial direction of the mixing chamber, which second angle is different from the first angle, wherein in the second operation state the fuel is introduced at substantially the same axial position with respect to the opening as in the first operation state.

According to a fourth aspect of the present invention, it is provided a method for operating an industrial burner of the type mentioned above. Here, a mixing chamber is continually supplied with combustion air and a fuel supplier is switched between two operation states, wherein the flow-, mixing- and temperature profile of the combustion air and the fuel in the mixing chamber are influenced by the switching such that in the first operation state, at least a portion of the combustion takes place in the mixing chamber, and in the second operation state, fuel and combustion air are pre-mixed in the mixing chamber and are combusted at least partially in the furnace room.

According to a fifth aspect of the present invention, it is provided a method for operating an industrial burner comprising a mixing chamber having an axial direction, which is provided with at least one opening into a furnace room, through which opening at least a partially-mixed fuel-air-flow from the mixing chamber dispenses into the furnace room during operation, a combustion air supplier, through which the mixing chamber is supplied with combustion air during operation, a fuel supplier, with which fuel is introduced into the mixing chamber. The inventive method comprises at least the steps of continually supplying the mixing chamber with combustion air, introducing fuel into the mixing chamber in a first operation state only at a first angle such that fuel and air are mixed in the mixing chamber and at least a partial reaction is carried out therein, and introducing fuel into the mixing chamber and at least a partial reaction is carried out therein, and introducing fuel into the mixing chamber in a second operation state, in addition to the introduction of fuel at the first angle, at substantially the same axial position with respect to the opening of the mixing chamber at a second angle with respect to the axial direction of the mixing chamber, which second angle is different from the first angle. The amount of fuel introduced at the second angle is in the range of 10 to 100% of the total fuel flow introduced into the mixing chamber at the first and the second angle such that fuel and combustion air are pre-mixed in the mixing chamber and are combusted at least partially in the furnace room.

In a preferred embodiment of the invention, an industrial burner according to the invention comprises a mixing chamber that is provided with at least one opening into the furnace room; during operation, at least a partially pre-mixed fuel stream flows out of the mixing chamber through the opening into the furnace room. A portion of the combustion is introduced into the mixing chamber by means of a combustion air supplier, wherein the mixing chamber can be continually supplied with combustion air. Moreover, instead of pure air, an air/exhaust mixture can be supplied, e.g., when the inventive burner is utilized as a recuperator burner. The fuel is introduced into the mixing chamber by means of a fuel supplier. The fuel supplier is adapted to switch between a first and a second operation state, wherein in the first operation state, the fuel is introduced into the mixing chamber at a first angle to the axial direction of the mixing chamber, i.e., the rotational axis of the combustion air inlet with respect to the opening in the furnace room, such that fuel and air are mixed in the mixing chamber and form a reaction-capable mixture. In addition, they carry out at least a partial reaction already in the mixing chamber, so that a flame results in the mixing chamber before they flow through the nozzle-shaped outlet into the furnace room. In the second operation state, fuel is introduced into the mixing chamber at a second angle that differs from the first angle, wherein the axial position, at which the fuel is introduced into the mixing chamber by the fuel supplier, remains essentially unchanged. That means, the distance between the exhaust of the fuel supplier and the opening of the mixing chamber in the furnace room in the axial direction of the mixing chamber is essentially the same in both operation states. In the second operation state, the fuel is preferably introduced into the mixing chamber through the first fuel supplier as well as the second fuel supplier. Thus, each of the fuel supplier devices comprises one or more nozzle openings that can be designed in known way to include slots, to be round or in any other suitable geometric shape.

It is ensured by this configuration that in the first operation state, a thorough mixing of the fuel and combustion air takes place in the mixing chamber and combustion can at least partially take place in the mixing chamber. On the contrary, in the second operation state, by suitably selecting the proportion of the entire fuel of the fuel stream discharging at a first angle and/or at a second angle, i.e., in particular by controlling the corresponding fuel amount and exhaust angle, it is ensured that the flow profile and thus also the mixing profile of the air and fuel, as well as the temperature profile in the mixing chamber, can be influenced such that the combustion is substantially shifted to the area outside of the mixing chamber, i.e., to the furnace room. At the same time, it is also ensured already in the mixing chamber that an at least partially pre-mixed fuel stream discharges from the mixing chamber opening into the furnace room, so that the combustion can take place there. A reaction-capable mixture is located in the mixing chamber in all operation states at least with respect to the material balance, although the mixing is not sufficient thorough, in particular in the second operation state, in order to ensure a stable combustion already in the mixing chamber. By shifting the combustion from the mixing chamber to the furnace room in the second operation state, it is possible to place fewer thermal demands on the mixing chamber itself as well as the mixing device, i.e., the fuel and air suppliers, and thus to ensure an increased service life of the components of the industrial burner and to increase the usage temperature in the furnace room.

For this purpose, in the second operation state, the fuel is preferably introduced through the second fuel supplier device in a proportion of 10% to 100%, more preferably from 50% to 100% of the entire fuel stream, wherein preferably 100% is not included, so that in the second operation state, fuel is always supplied through both fuel suppliers that open into the mixing chamber at different angles. In this case, the flow formation and the mixture formation of the fuel and the combustion air in the mixing chamber can be better influenced and calibrated or adjusted.

Preferably, the first angle for the first operation state is larger than the second angle. In principle, it is also conceivable that the second angle can be larger than the first angle. One of the two angles can be 0°, i.e., the fuel stream discharged through one of the fuel lances is introduced into the mixing chamber in the axial direction. This allows a simple configuration of the opening of the fuel supplier into the combustion chamber, as well as the possibility of desirably influencing the flow, so that not only the usage areas of a burner can be enlarged and it is possible to protect the material of the mixing chamber, but also the exhaust emissions, in particular NOx, can be reduced by the desired flow influence. By clever selection of the angle with respect to the axial direction of the mixing chamber, in particular during the heating up process, i.e., the first operation state, a higher burner performance can be achieved due to improved stability conditions and desired thorough mixing of fuel and air in the mixing chamber. The fuels are arbitrarily selectable, so that in particular oil or solid fuels are also possible in principle.

The fuel supplier preferably comprises a first and a second fuel supplier device that are each preferably further provided with fuel lances; the fuel lances are connected, e.g., form-fit or another way, with a mixing device on its mixing chamber side end. The mixing device common to both fuel lances comprises the nozzle openings at the first and the second angle with respect to the axial direction of the mixing chamber, which nozzle openings are connected with the first and the second fuel lances, respectively. This simplifies the assembly of the industrial burner, because only one mixing device that defines the direction of the fuel flow is necessary. At the same time, an additional apparatus can be attached to the mixing device, e.g., in order to influence the flow characteristics of the supplied air, e.g.,, to swirl it. Moreover, this construction guarantees that the fuel introduction into the mixing chamber in the first as well as the second operation state takes place essentially at the same axial distance with respect to the opening of the mixing chamber into the furnace room.

If a device for monitoring the combustion is provided according to a preferred embodiment, e.g., as a UV-probe or by means of an ionization method, it is thus possible to control the switching between the first and the second operation state as a function of the detected flow characteristics and/or the combustion in the mixing chamber. In particular, by monitoring the flow state into the mixing chamber in such a manner, a switching between the supply of the fuel flow for the first operation state and the second operation state at less than 800° C. is also possible, which up to now has served as the critical temperature point for altering the operation conditions after heating-up.

The angle, at which the fuel is supplied in the first and second operation states, is in principle freely selectable, as long as the angles re different from each other. However, one can also achieve the same effect with the same angles, but e.g., with different numbers, special arrangements or shapes of the nozzle openings and/or generally by different impulse fuel in-flows in the two operation states, also when the nozzles have the same angle with respect to the axial direction. Thus, even when the nozzles are disposed at identical angles, this can result in that the fuel arrives into the mixing chamber at different angles in the first and second operation states.

BRIEF DESCRIPTION OF THE DRAWING

In the following, the invention will be described by means of examples with the help of FIG. 1, which shows a first exemplary example of the industrial burner.

DETAILED DESCRIPTION OF THE INVENTION

Figure 1:
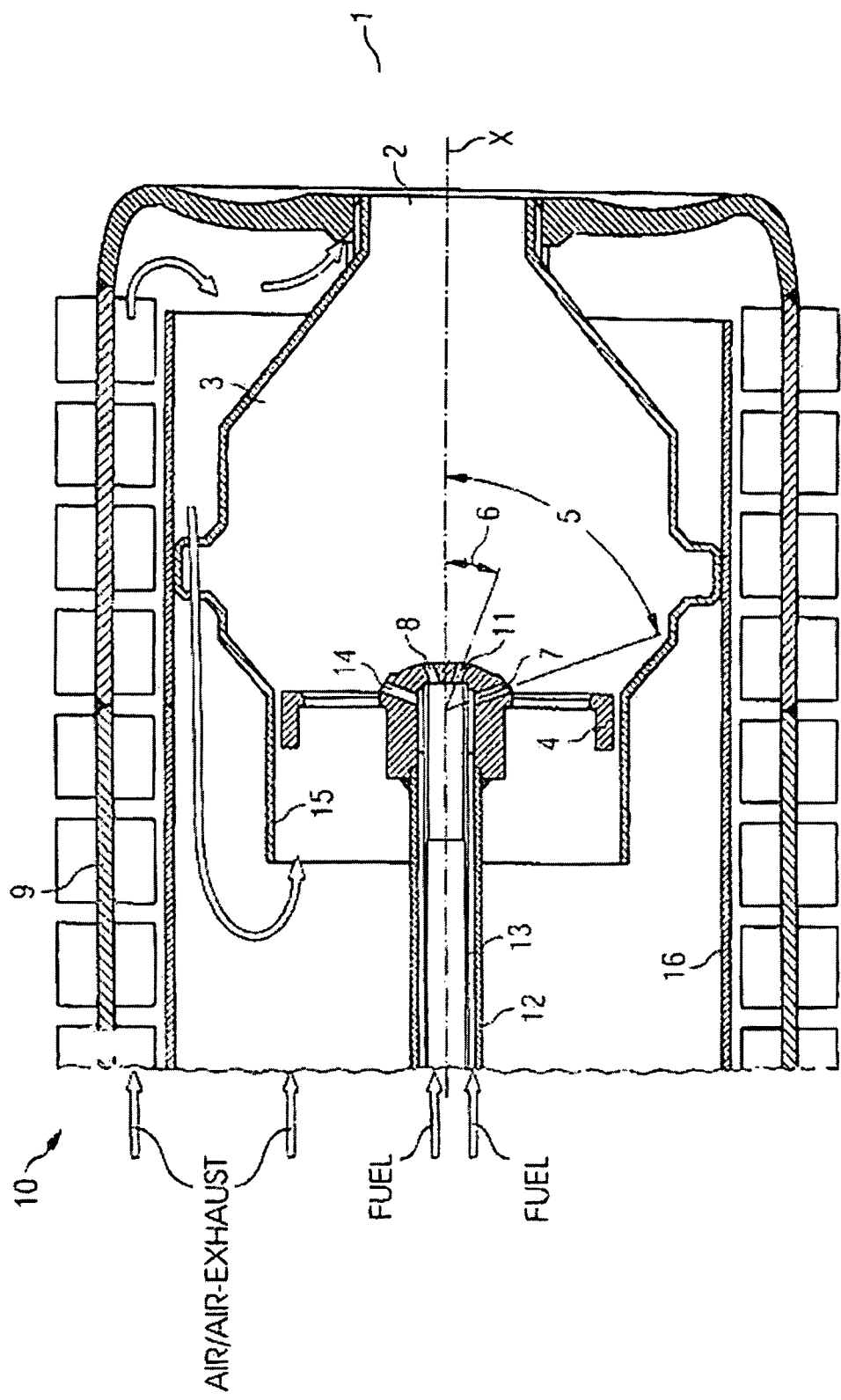

The industrial burner 10 shown in FIG. 1 is configured as a recuperator burner. In addition to the use of the inventive industrial burner for a recuperator burner, the use as a high-speed burner, with or without external air pre-heating, as a regenerative burner in industrial furnace constructional and the like is also conceivable.

The recuperator burner 10 illustrated in FIG. 1 possesses a mixing chamber 3 designed so as to be rotationally-symmetric and/or substantially rotationally-symmetric about an axis X defined in the axial direction of the assembly; the mixing chamber 3 opens downstream into a furnace room 1 or a heating room through an opening 2 that can be designed as a nozzle. The boundary of the furnace room 1 is not illustrated in FIG. 1. A combustion air supplier 15, which is co-axial to the mixing chamber 3, is attached upstream with respect to the mixing chamber 3, which in this embodiment is an integral, and thus one-piece, construction; air or a partial air amount and/or in the case of a recuperator burner, e.g., an air-/exhaust mixture, is supplied through the combustion air supplier 15 into the mixing room formed by the mixing chamber 3. Moreover, the combustion air supplier 15 is completed by a pipe 16 surrounding the outside of the mixing chamber 3; the combustion air flows through the pipe 16 into the pipe-shaped combustion air supplier 15 and the mixing chamber 3. The pipe 16 and the combustion air supplier 15 are likewise concentric to the rotational axis X.

For supplying the fuel, which can in principle be any kind of fuel, i.e., also oil-based or solid fuels in addition to gaseous fuels, fuel lances 12, 13 are provided that are arranged concentrically with respect to each other such that the fuel lance 12 surrounds the fuel lance 13. Both fuel lances 12, 13 open at their downstream ends into the mixing chamber 3 at approximately the same distance from the opening 2 in the axial direction. In particular, the fuel lances 12, 13 open approximately at the junction of the combustion air supplier 15 and the mixing chamber 3. The fuel lances 12, 13 are integrated into the system such that fuel can be supplied through one of the lances as s function of the respective other lance and the amount of the fuel flow can be adjusted. This means that the fuel flows through the lance 12 and/or through the lance 13 are freely adjustable independent from each other and thus any arbitrary mixing ratio of the fuel flows can be supplied through the lances 12, 13 and can be dispensed therefrom.

The fuel lance 12 that surrounds the fuel lance 13 opens into the mixing chamber 3 through nozzle openings 14, which are provided in a mixing device 4 as passage openings through the cup-shaped mixing device. The mixing device 4 is mounted and affixed to the downstream end of the fuel lances 12, 13. Fuel is dispensed through fuel lance 12 into the mixing chamber 3 at a first angle 5. The first angle 5 is the angle that each nozzle opening 14 forms with the rotational axis X of the mixing chamber 3. The fuel lance 12, the mixing device 4 and in particular the nozzle openings 14 provided therein, as well as a not-illustrated control-and regulation-device for supplying fuel through the fuel lance 12, form a first fuel supply device.

The second fuel lance 13 opens into the mixing chamber 3 through the nozzle openings 11 that are similarly provided in the mixing device 4, like the nozzles 14, approximately at the same axial distance from the opening 2. However, the nozzles 11 are arranged at a second angle 6 to the rotational-symmetry axis X of the mixing chamber 3. The second angle 6 is different from the first angle 5. In particular, the angle 6 is smaller than the angle 5. The fuel lance 13, the nozzles 11 and a not-illustrated regulation- and control-device for regulating and controlling the supply of fuel through the fuel lance 13 form a second fuel supply device 8.

As a whole, the fuel supply devices 7, 8 are likewise disposed concentrically with respect to the rotational axis X of the mixing chamber 3. The combustion air and/or mixture of exhaust gas and combustion air flow(s) radially outside the fuel lances 12, 13 into the mixing chamber 3 and thus, if necessary, can pass into the mixing device 4 through appropriate flow direction devices.

According to the illustrated embodiment, a corrugated recuperator 9 is provided so as to surround the pipe 16 and is likewise rotationally-symmetrically formed; the corrugated recuperator 9 is perfused radially outside by exhaust gases flowing from the furnace room 1 in the counter-direction and radially inside by at least the large part of the in-flowing combustion air or an air-/exhaust gas mixture. The combustion air flowing past the recuperate 9 encounters the exhaust gases from the furnace room in a heat exchange relationship and is pre-heated; thereafter, it returns to the interior of the pipe 16 for the combustion air supplier 15 and is at least partially supplied into the mixing chamber 3.

When fuel is supplied through the fuel lance 12 via the nozzle openings 14 into the mixing chamber 3 in a first operation state, in particular when heating up the furnace, the fuel can be mixed with the combustion air in the mixing chamber 3 due to the relatively severely radially-outwardly directed supply device for the fuel and forms a reaction-capable and ignitable mixture already in the mixing chamber 3. The mixture can be ignited in the mixing chamber 3 by (not-illustrated) ignition devices. It forms a flame there. Only a small amount or no fuel is supplied through the fuel lance 13 in this operation state. The flame reaches through the opening 2, so that the main combustion takes place in the furnace room 1 downstream of the opening 2.

As a result, the flame stabilizes itself in the mixing chamber, because a stable mixing of the combustion air and fuel is already achieved during the heating up process due to the clever selection of the angle 5, approximately in the range of 70-80° with respect to the axis X.

When it is ascertained in the mixing chamber 3 that the heating up process has been sufficiently performed, based upon the detection of the temperature in the mixing chamber, e.g., at 800° C., or based upon a monitoring of the flow processes by means of ionization or a UV- probe, it is switched to the second operation manner. In this second operation manner, fuel is introduced into the mixing chamber 3 through the fuel lance 13 and the nozzle openings 11. In addition, fuel can also be introduced, as necessary and preferably at a lower proportion, into the mixing chamber 3 through the fuel lance 12 and the nozzles 14. Because the fuel supplied into the mixing chamber 3 through the fuel lance 13 is dispensed at the nozzle openings 11 at a smaller angle with respect to the rotational axis X, e.g., at an angle of approximately 20-30°, an equally-thorough mixing with the combustion air flowing in radially outside of the fuel supplier does not take place as in the first operation state. Nevertheless, fuel and air are mixed in the mixing chamber 3 so that at least a balanced, reaction-capable mixture is present in the mixing chamber. However, a thorough mixing is preferably not performed so as to cause the mixture to become ignition-capable; instead, a pre-mixed and/or partially pre-mixed fuel flow is dispensed from the mixing chamber opening 2, which fuel flow does not chemically react at all, or only in a very small proportion, inside the mixing chamber 3 during the second operation state. By monitoring the flow conditions into the mixing chamber 3 by means of ionization or a UV-probe, it is possible to calibrate the proportion of the fuel supplied through the fuel lance 12 and the nozzle openings 14 so that a desired mixing and/or a desired flow influence, which is adapted to the instantaneous operation state, takes place in the mixing chamber 3.

Essential to the invention is that a device is provided that allows fuel to be introduced into the mixing chamber with different impulses as a function of the operation state of the burner and always spaced form the opening of a mixing chamber into a furnace room; thus, the mixing can be influenced, as desired, by the combustion air supplied into the mixing chamber radially outside of the fuel.

What is claimed is:

1. An industrial burner with low $NO_x$ emissions, in particular for heating furnace rooms of industrial furnaces comprising:

a mixing chamber connected with a furnace room, which is provided with at least one opening into the furnace room, through which opening at least a partially-mixed flow from the mixing chamber dispenses into a furnace room during operation;

a combustion air supplier, through which the mixing chamber is supplied with combustion air delivered from a radially outside direction during operation; and, a fuel supplier, with which fuel is introduced into the mixing chamber, wherein the fuel supplier is arranged and constructed to switch between a first and a second operation state, wherein in the first operation state, fuel is introduced into the mixing chamber at a first angle with respect to the axial direction of the mixing chamber and at a fixed axial distance within said mixing chamber with respect to said at least one opening into said furnace room such that fuel and air are mixed thoroughly in the mixing chamber and at least a partial reaction is carried out therein such that a flame is produced in said mixing chamber; and wherein in the second operation state, fuel is introduced into the mixing chamber at the same fixed axial distance within said mixing chamber with respect to said at least one opening into said furnace room as in the first operation state and additionally at least at a second angle with respect to the axial direction of the mixing chamber, which second angle is different from the first angle;

wherein said combustion air is introduced into said mixing chamber at a point radially outside said first angle introduction point and said second angle introduction point;

wherein said first angle is larger than said second angle;

wherein said fuel from said first angle is introduced into the mixing chamber farther from said axis than fuel introduced into the mixing chamber from said second angle;

wherein in said second operation state combustion is substantially shifted to said furnace room; and, wherein said industrial burner is configured to heat said furnace room of said industrial burner.

2. The industrial burner according to claim 1, wherein the fuel supplier comprises two fuel supply devices that are each provided with one or more nozzle openings.

3. The industrial burner according to claim 2, wherein in the first operation state, fuel is introduced into the mixing chamber only through the first fuel supply device, and in the second operation state, the fuel is introduced at a proportion of 10 to 100%, while the rest of the total fuel flow is introduced through the first fuel supply device.

4. The industrial burner according to claim 2, wherein the second fuel supply device is formed by a second fuel lance extending in the axial direction of the mixing chamber and opening therein, which the second fuel lance is connected at its mixing chamber side end with a mixing device, in which the nozzle openings are provided at the second angle with respect to the axial direction of the mixing chamber, and the first fuel supply device is formed by a first fuel lance co-axially attached to and surrounding the second fuel lance, which first fuel lance is connected at its mixing chamber side end with the mixing device, in which the nozzle openings are provided at the first angle.

5. An industrial burner comprising:
- a mixing chamber connected to a furnace room having an axial direction, the mixing chamber being provided with at least one opening into said furnace room, through which opening at least a partially-mixed flow from the mixing chamber dispenses into the furnace room during operation;
- a combustion air supplier, through which the mixing chamber is supplied with combustion air delivered from a radially outside direction during operation;
- a first fuel supply device arranged and constructed to introduce fuel into the mixing chamber at a fixed axial distance within said mixing chamber with respect to said at least one opening into said furnace room;
- a second fuel supply device arranged and constructed to introduce fuel into the mixing chamber at the same fixed axial distance within said mixing chamber with respect to said at least one opening into said furnace room at a second angle with respect to the axial direction of the mixing chamber, which second angle is different from the first angle; and,
- a control arranged and constructed to switch the first and second fuel supply device between a first and a second operation state, wherein in the first operation state, fuel is introduced into the mixing chamber only through the first fuel supply device such that fuel and air are mixed thoroughly in the mixing chamber and at least a partial reaction is carried out therein such that a flame is produced in said mixing chamber; and
- wherein in the second operation state, fuel is introduced into the mixing chamber through the second fuel supply device at a proportion of 10 to 100%, while the rest of the total fuel flow is introduced through the first fuel supply device;
- wherein said first angle is larger than said second angle;
- wherein said fuel from said first angle is introduced into the mixing chamber farther from said axis than fuel introduced into the mixing chamber from said second angle;
- wherein said combustion air is introduced into said mixing chamber at a point radially outside said first angle introduction point and said second angle introduction point;
- wherein in said second operation state combustion is substantially shifted to said furnace room; and,
- said industrial burner is configured to heat said furnace room.

6. The industrial burner according to claim 5, wherein in the second operation state, fuel is introduced into the mixing chamber through the second fuel supply device at a proportion of 50 to 100% while the rest of the total fuel flow is introduced through the first fuel supply device.

7. An industrial burner comprising:
- a mixing chamber connected with a furnace room via at least one opening such that at least a partially-mixed flow from the mixing chamber dispenses into the furnace room during operation;
- a combustion air supplier for supplying the mixing chamber with combustion air delivered from a radially outside direction during operation of the industrial burner; and,
- a fuel supplier for introducing fuel into the mixing chamber, wherein the fuel supplier is arranged and constructed to switch between a first and a second operation state, wherein in the first operation state, fuel is introduced into the mixing chamber at a first angle with respect to the axial direction of the mixing chamber such that fuel and air are mixed thoroughly in the mixing chamber and at least a partial reaction is carried out therein such that a flame is produced in said mixing chamber; and,
- wherein in the second operation state, fuel is introduced into the mixing chamber at a second angle with respect to the axial direction of the mixing chamber, which the second angle is different from the first angle, wherein in the first and second operation states the fuel is introduced at the same fixed axial distance within said mixing chamber with respect to said at least one opening into said furnace room;
- wherein said first angle is larger than said second angle;
- wherein said fuel from said first angle is introduced into the mixing chamber farther from said axis than fuel introduced into the mixing chamber from said second angle;
- wherein said combustion air is introduced into said mixing chamber at a point radially outside said first angle introduction point and said second angle introduction point;
- wherein in said second operation state combustion is substantially shifted to said furnace room; and,
- said industrial burner is configured to heat said furnace room.

8. A method for operating an industrial burner with low $NO_x$ emissions, in particular for heating of furnace rooms of industrial furnaces comprising a mixing chamber connected with a furnace room, which is provided with at least one opening into the furnace room and said industrial burner is configured to heat the furnace room, through which opening at least a partially-mixed fuel flow from the mixing chamber dispenses into the furnace room during operation, a combustion air supplier, through which the mixing chamber is supplied with combustion air delivered from a radially outside direction during operation, a fuel supplier, with which fuel is introduced into the mixing chamber, the method comprises at least the steps of:
- continually supplying the mixing chamber with combustion air; and,
- switching the fuel supplier between two operation states, wherein the flow profile, mixing profile and temperature profile of the combustion air and the fuel in the mixing chamber are influenced by the switching such that in the first operation state the combustion air and the fuel are mixed thoroughly and at least a portion of the combustion takes place in the mixing chamber such that a flame is produced in said mixing chamber; and,
- in the second operation state, fuel and combustion air are pre-mixed in the mixing chamber and are combusted at least partially in the furnace room such that a partial combustion reaction occurs in said mixing chamber and said combustion reaction is substantially shifted to said furnace room;
- wherein the fuel is introduced at the same fixed axial distance within said mixing chamber with respect to the opening into the furnace room;
- wherein in the first operation state the fuel is introduced at a first angle and in the second operation state the fuel is introduced at least at a second angle, said first angle being larger than said second angle;
- wherein said combustion air supplier supplies said combustion air only from radially outside the largest of said first and second angles; and,
- wherein said combustion air is introduced into said mixing chamber at a point radially outside said first angle introduction point and said second angle introduction point.

* * * * *